United States Patent
Gailloux et al.

(10) Patent No.: US 8,054,948 B1
(45) Date of Patent: Nov. 8, 2011

(54) AUDIO EXPERIENCE FOR A COMMUNICATIONS DEVICE USER

(75) Inventors: Michael A. Gailloux, Overland Park, KS (US); Michael W. Kanemoto, Overland Park, KS (US)

(73) Assignee: Sprint Communications Company L.P., Overland Park ( * ) Notice: Subject to any disclaimer, the term of this patent is extended or adjusted under 35 U.S.C. 154(b) by 1166 days.

(21) Appl. No.: 11/769,815

(22) Filed: Jun. 28, 2007

(51) Int. Cl.
*H04M 11/06* (2006.01)
*G10L 19/14* (2006.01)

(52) U.S. Cl. .......... 379/88.13; 84/603; 381/1; 381/56; 381/382; 386/329; 704/200.1; 704/205; 704/224; 704/258; 713/1; 714/751; 715/725

(58) Field of Classification Search .......... 345/722; 379/88.13; 704/224, 200.1, 205, 258; 707/3; 715/725; 84/603; 381/1, 56, 382; 386/329; 713/1; 714/751
See application file for complete search history.

(56) References Cited

U.S. PATENT DOCUMENTS

| | | | |
|---|---|---|---|
| 4,297,535 A * | 10/1981 | Hehemann | 381/382 |
| 4,581,484 A * | 4/1986 | Bendig | 379/88.13 |
| 5,886,276 A * | 3/1999 | Levine et al. | 84/603 |
| 6,006,351 A * | 12/1999 | Peretz et al. | 714/751 |
| 6,574,423 B1 * | 6/2003 | Oshima et al. | 386/329 |
| 7,353,169 B1 * | 4/2008 | Goodwin et al. | 704/224 |
| 7,603,623 B1 * | 10/2009 | Lengeling et al. | 715/725 |
| 7,676,360 B2 * | 3/2010 | Ghanekar et al. | 704/205 |
| 7,711,123 B2 * | 5/2010 | Crockett | 381/56 |
| 7,788,476 B2 * | 8/2010 | McNutt et al. | 713/1 |
| 7,970,144 B1 * | 6/2011 | Avendano et al. | 381/1 |
| 2003/0065655 A1 * | 4/2003 | Syeda-Mahmood | 707/3 |
| 2003/0164845 A1 * | 9/2003 | Fayan et al. | 345/722 |
| 2004/0044525 A1 * | 3/2004 | Vinton et al. | 704/224 |
| 2004/0122662 A1 * | 6/2004 | Crockett | 704/200.1 |

* cited by examiner

*Primary Examiner* — Gerald Gauthier

(57) ABSTRACT

A system and associated methods provide an audio experience such that a user spatially perceives one or more audio events. One particular method set forth involves obtaining audio events and presenting the audio events so that an audio experience is provided. According to one embodiment of the method, upon obtaining audio events, the audio events are associated with one or more corresponding audio components. Thereafter, the audio experience is determined based on the audio events and associated audio components. The audio experience is then presented such that the user may spatially perceive the audio events.

20 Claims, 6 Drawing Sheets

AUDIO EXPERIENCE FOR A COMMUNICATIONS DEVICE USER

CROSS-REFERENCE TO RELATED APPLICATIONS

Not applicable.

STATEMENT REGARDING FEDERALLY SPONSORED RESEARCH OR DEVELOPMENT

Not applicable.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The system and methods embodied herein provide an audio experience. In particular, an audio experience refers to a spatial perception of one or more audio events. Such an experience permits the incorporation of communication audio into a spatial audio environment. In one aspect, a method is set forth for providing an audio experience. According to the method, a first audio event and a second audio event are obtained. Thereafter, the first audio event is associated with one or more first corresponding audio components and the second audio event is associated with one or more second corresponding audio components. The audio experience is then determined based on at least the first audio event and the associated one or more first corresponding audio components and the second audio event and the associated one or more second corresponding audio components. Upon determining the audio experience, the audio experience comprises a spatial perception of the audio events is presented.

Additional advantages and features of the invention will be set forth in part in a description which follows, and in part will become apparent to those skilled in the art upon examination of the following, or may be learned by practice of the invention.

BRIEF DESCRIPTION OF THE SEVERAL VIEWS OF THE DRAWING

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

Figure 1:
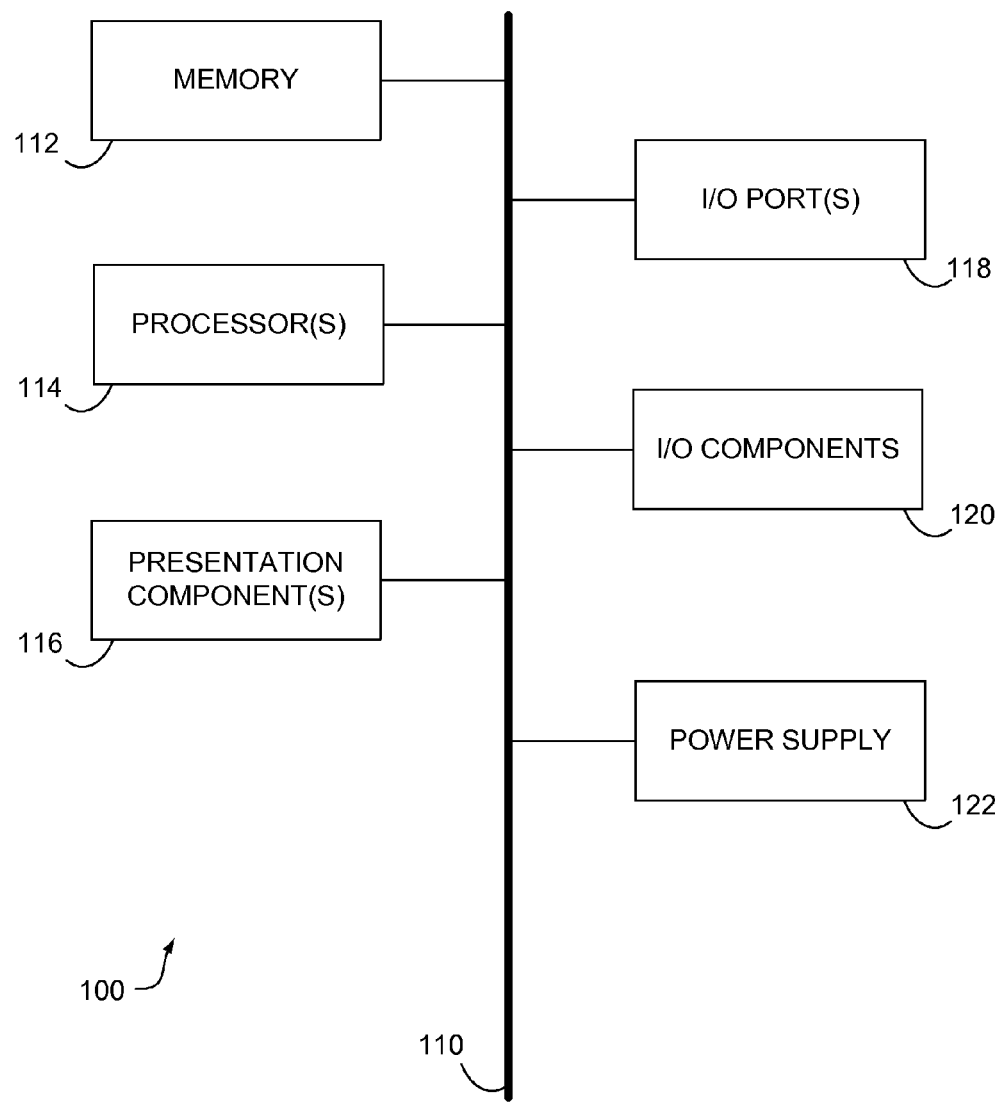
FIG. 1 is a schematic view of an exemplary operating environment suitable for use in implementing the present invention.

Referring initially to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components illustrated.

The invention may be described in the general context of computer code or machine-useable instructions, including computer-executable instructions such as program modules, being executed by a computer or other machine. Generally, program modules including routines, programs, objects, components, data structures, etc., refer to code that perform particular tasks or implement particular abstract data types. The invention may be practiced in a variety of system configurations, including mobile telephones, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would be more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention.

Computing device 100 typically includes a variety of computer-readable media. By way of example, and not limitation, computer-readable media may comprises Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. In the case of a mobile telephone, for example, the one or more processors 114 may include an application specific integrated circuit (ASIC) where memory 112 is located on the one or more processors 114. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in.

Figure 2:
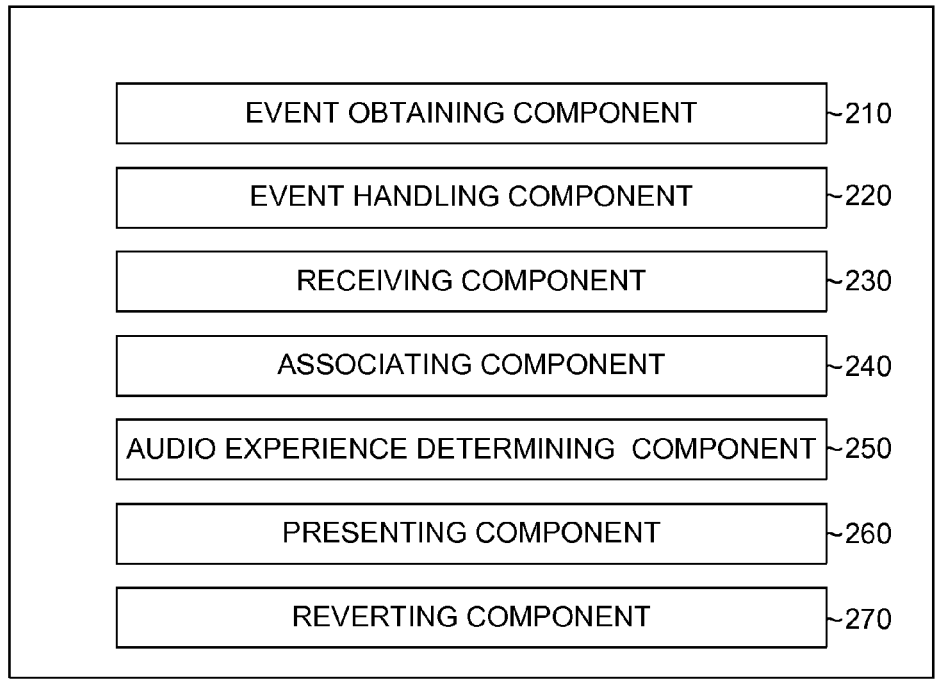
FIG. 2 is a diagrammatic view of a system for providing an audio experience.

Turning now to FIG. 2, an exemplary computing system 200 for providing an audio experience via a communications device is illustrated. Such a computing system 200 provides an audio experience to a user that incorporates communications into a spatial audio environment. Accordingly, a user may utilize a communications device to concurrently receive more than one audio event each of which occupies a specific audio space. A communications device may include any device that may communicate data, such as a mobile telephone, a personal digital assistant, or other computing device. Such a communications device may also include any component that may be associated with the communications device, such as an ear piece.

As used herein, an audio experience refers to a spatial perception of one or more audio events each of which is associated with one or more audio event attributes. An audio event may include any communications device event having an audio aspect. For example, an audio event may include an incoming call audio, i.e., ring tone; a voice audio; a voicemail audio; an outgoing call audio; a video audio; a music audio; an alert audio, e.g., a task, appointment, or voicemail alert; or a text-to-voice audio. A text-to-voice audio may include any such text to voice audio pertaining to, for example, a short message service (SMS), an email, an instant message, a really simple syndication (RSS), or other internet text, e.g., weather, driving direction, news, or the like.

An audio event attribute, as used herein, may include data pertaining to the spatial placement of an audio event such that each audio event has an audio space. As such, an audio event attribute may comprise, for example, timing data, volume data, wave form data, a distribution data, or the like. Timing data pertains to the timing, such as the delay, of presenting an audio event. Volume data pertains to the degree of loudness, e.g., loud, soft, mute, of the audio event presentation. Wave form data pertains to the shape and form of an audio signal. Distribution data pertains to the distribution of the audio event to the channels, such as a left and right channel.

In operation, the audio event attributes, coupled with the audio event, provide the audio space and, thereby, the spatial perception associated with an audio experience. An audio space may include, for example, a position aspect, a distance aspect, or a combination thereof. Accordingly, the audio event attributes may present the spatial perception of position, distance, or the like. A position aspect refers to the spatial position of the audio event. For example, an audio event may be presented such that a user perceives the audio in a front position, left position, right position, rear position, or any combination thereof. A distance aspect refers to spatial distance of the audio event. For example, an audio event may be presented such that a user perceives the audio near the user or distant to the user.

In some instances, an audio event may be associated with more than one audio event attribute to provide the desired spatial perception. For example, assume the desired audio space position for an audio event, such as an incoming call audio, is a left position. To attain the desired spatial perception, the audio event may be associated with volume and distribution audio event attributes. As such, the volume audio event attribute may increase the volume of the audio event to the right ear, and the distribution audio event attribute may distribute the audio event to the left channel. Accordingly, the user may perceive the audio event to have an audio space of a left position.

As shown in FIG. 2, an exemplary computing system 200 for providing an audio experience includes an event obtaining component 210, an event handling component 220, a receiving component 230, an associating component 240, an audio experience determining component 250, a presenting component 260, and a reverting component 270. In some embodiments, one or more of the illustrated components may be implemented as one or more stand-alone applications. In other embodiments, one or more of the illustrated components may be integrated directly into an operating system or an application of a server and/or an end-user device, such as a mobile telephone or other computing device. It will be understood by those of ordinary skill in the art that the components illustrated in FIG. 2 are exemplary in nature and in number and should not be construed as limited. Any number of components may be employed to achieve the desired functionality within the scope of embodiments hereof.

The event obtaining component 210 is configured to obtain audio events. Such audio events may be an incoming audio event, an outgoing audio event, or an ongoing audio event. An incoming event may include, for example, an incoming call audio or an alert indicating an email has been received. An outgoing audio event may include, for example, an outgoing call audio or an alert indicating an email has been sent. An ongoing audio event may include audio events that are not incoming or outgoing, such as the audio presented from communicating on the phone or listening to music. For example, upon accepting a phone call, the voice audio is an ongoing event and remains an ongoing event until the call is ended.

To obtain audio events, the event obtaining component 210 may, for example, receive, retrieve, or access an audio event. In one embodiment, the event obtaining component 210 may receive, retrieve, or access audio events based on a user indication, automatically, or a combination thereof. Obtaining audio events based on a user indication may include, for example, a user indication requesting an outgoing communication, e.g., placing a phone call, sending an email, and the like; and a user indication requesting on ongoing event, e.g., listening to music, accepting a phone call. Obtaining audio events automatically may include, for example, an incoming call audio; an alert pertaining to an email, calendar event, task, or voicemail; and an automatic text-to-speech audio, e.g., an automatic weather update. In some embodiments, audio events automatically obtained may be based on a user or a program developer or administrator. For example, an incoming call audio is only automatically obtained when the phone is activated and the phone volume is turned on. Further, an alert or text-to-speech audio may be automatically obtained where the communications device is configured, by the user or program developer, to provide an automatic alert or automatically convert text-to-speech on an incoming message.

The event handling component 220 is configured to handle one or more events. The functions performed by event handling component 220 varies depending on the event type. For example, in the case of an incoming phone call, the event handler may determine who placed the phone call, display the phone number on the phone, and the like. In some embodiments, event handling component 220 may also be configured to determine whether to handle the event obtained by event obtaining component 210. In such an embodiment, an event obtained by obtaining component 210 may not be handled in instances, for example, where the obtained event comprises an ongoing event that was previously handled.

The receiving component 230 is configured to receive an indication to provide an audio experience. In one embodiment, an indication to provide an audio experience may be provided upon the event obtaining component obtaining two or more audio events. The receiving component 230 may receive an indication to provide an audio experience automatically, based on a user indication, or a combination thereof. An indication to provide an audio experience may be received automatically based on the communication device configuration established by a user, program developer, or program administrator. For example, a user, program developer, or program administrator may configure the communication device such that upon obtaining two or more specific audio events, an indication to provide an audio experience is presented. Such a configuration may be established via a user interface. One skilled in the art will recognize that where a communication device is configured to automatically provide an audio experience, such an experience may be provided without receiving component 230 receiving an indication.

An indication to provide an audio experience may also be received based on a user indication. A user may provide such an indication via a user interface or a gesture. Utilizing a user interface to provide an indication may comprise manipulating settings displayed on the communications device or another computing device connected to the communications device. Alternatively, utilizing a user interface to provide an indication may comprise selecting a button on the communications device. Utilizing a gesture to provide an indication may comprise performing a motion, providing a verbal indication, and the like.

The associating component 240 is configured to associate one or more audio events obtained by event obtaining component 310 with one or more audio components. As used herein, the phrase "audio component" may refer to an audio space, an audio space aspect, an audio event attribute, or a combination thereof. In an embodiment where the audio event is only associated with an audio space, e.g., a left-front position, the associating component 240 may also be configured to determine one or more audio event attributes that achieve the associated audio space. For example, assuming the audio event is associated with an audio space having a left position, the associating component 240 may determine that one audio event attribute comprises a left channel distribution. In an embodiment where the audio event is only associated with one or more audio event attributes, the associating component 240 may also be configured to determine the resulting audio space based on the audio event attributes. For example, assuming the audio event is associated with a left channel distribution audio event attribute, the associating component 240 may determine that the resulting audio space comprises a left position.

In some embodiments, an audio event may be associated with an audio space and/or one or more audio event attributes based on the audio event category, the audio event type, the specific audio event, and the sequential order of the audio event. An audio event category may pertain, for example, to audio event functionality. For example, all audio events associated with a phone functionality may have the same audio space or audio event attributes while all audio events associated with an alert functionality may have another audio space of audio event attributes. An audio event type may pertain, for example, to the specific type of audio event, e.g., incoming call audio, voice audio, outgoing call audio, video audio, music audio, text-to-voice audio, alert audio, and the like. The specific audio event may include, for example, an incoming call audio from a specific friend, alert audios pertaining to tasks, and the like. The sequential order of the audio event may refer to the order of which the audio event was obtained. For example, a first obtained audio event, whatever the event, may be associated with specific set of audio event attributes while a second obtained audio events may be associated with a different set of audio event attributes.

In some embodiments, an audio event may not have a predetermined audio space or audio event attributes. In such a case, associating component 240 may associate the event with an audio space and/or audio event attributes upon a user's indication. Such an indication may express a desire for an audio experience. As such, the associating component 240 may generate, e.g., based on an algorithm, an associated audio space or audio event attribute. Alternatively, a user indication may express the desired association. For example, assume a user is listening to music when incoming voice call is received. In such a case, the user may indicate a left-position audio space by selecting a button on the communications device indicative of a left-audio position.

The audio experience determining component 250 is configured to determine an audio experience. In one embodiment, audio experience determining component 250 determines an audio experience based on the audio events and the associated audio components. Utilizing the audio events and the associated audio components, the audio experience determining component 250 may determine the manipulations necessary to achieve the desired audio experience. The manipulations may correspond to one or more audio events. Manipulations of an audio event may include modifications, for example, to the volume, the timing of presenting the audio event, the wave form, the distribution of the audio event to the channels, and the like. Such manipulations may include, for example, phasing, delaying, panning, and other audio filtering or manipulation. Upon determining the necessary manipulations, audio experience determining component may also be configured to mix the sound such that an audio experience may be presented.

By way of example only, assume a user is listening to music via the communications device when an incoming voice call is obtained. Further assume that the incoming voice call is associated with a left position audio space. As such, the audio experience determining component 250 may determine that both the music audio and the incoming voice call audio may be manipulated to provide the desired audio experience. Accordingly, the distribution of the audio event may change from an even distribution to a right channel distribution while the incoming voice call audio may be distributed via the left channel.

In an embodiment where associating component 240 neither associates an audio event with one or more audio event attributes nor determines audio event attributes based on the associated audio space, audio experience determining component 250 may be configured to determine audio event attributes based on a desired audio space. In some embodiments, associating component 240 may be configured to identify conflicting audio spaces. In such an embodiment, one of the conflicting audio spaces may be automatically modified based on a default or may be manually modified based on a user indicating such a modification.

The presenting component 260 is configured to present the audio experience determined by audio experience determining component 230. Such a presentation may allow a user to incorporate communications into a spatial audio environment. The presenting component 260 may be configured to present sound effects. For instance, when presenting an audio experience where one or more audio events have a change in audio space, the volume of an audio event may fade or strengthen during the transition. In one embodiment, the presenting component 260 may be configured to present an indication that an audio experience is presented. In such an embodiment, the indication may notify the user of the audio space for each audio event included in the audio experience.

The reverting component 270 is configured to revert an audio event to the form that existed prior to providing the audio experience. In some embodiments, the reverting component 270 may also be configured to determine if one of the audio events associated with the user experience has ended. For example, assume a user is listening to two audio events, such as music audio and voice audio, and a user experience is generated based on the two audio events and the associated audio components. In an instance where the user ends the voice audio, the remaining ongoing music audio may revert to the form that existed prior to providing the audio experience. As such, the music may revert to being presented on both the right and left channel.

Figure 3:
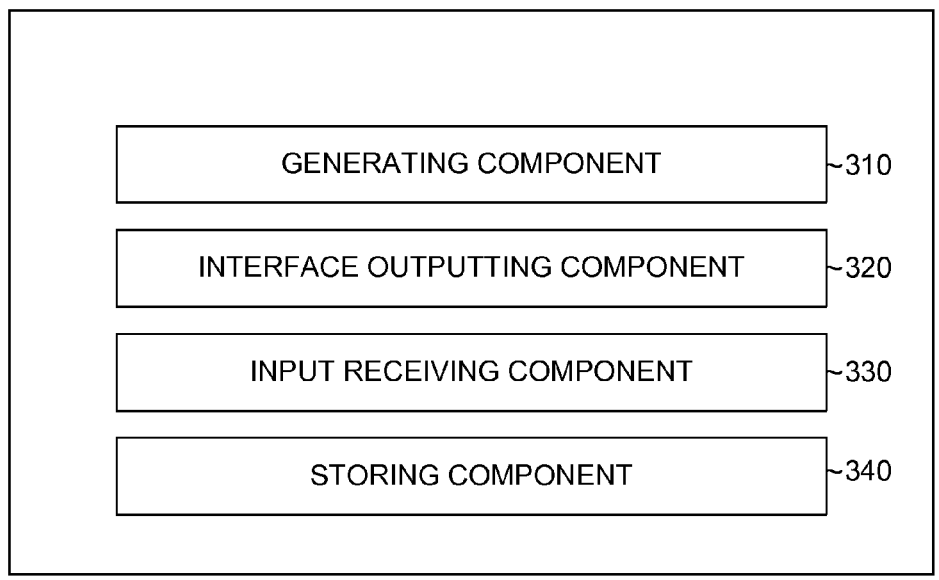
FIG. 3 is a diagrammatic view of a system for generating one or more audio components for an audio event.

Turning now to FIG. 3, an exemplary computing system 300 for generating one or more audio components for one or more audio events is illustrated. In some embodiments, the audio component generated may comprise an audio space, an audio space aspect, a audio event attribute, or a combination thereof. For example, to generate an audio space, a user may specify an audio space having a left position. Alternatively, a user may generate an audio event attribute that results in an left audio space position such, for example, a left distribution audio event attribute. Because generating an audio space may have a more definite result, rather than specifying the audio event aspects and not ascertaining the result, some embodiments may permit the user to generate an audio component comprising an audio space, e.g., a front left audio.

As shown in FIG. 3 an exemplary computing system 300 includes a generating component 310, an interface outputting component 320, an input receiving component 330, and a storing component 340. In some embodiments, one or more of the illustrated components may be implemented as one or more stand-alone applications. In other embodiments, one or more of the illustrated components may be integrated directly into an operating system or an application of a server and/or an end-user device. It will be understood by those of ordinary skill in the art that the components illustrated in FIG. 3 are exemplary in nature and in number and should not be construed as limited. Any number of components may be employed to achieve the desired functionality within the scope of embodiments hereof.

The generating component 310 is configured to receive an indication that a user desires to generate one or more audio components for one or more audio events. Generating an audio component for an audio event may refer to generating an initial audio component or generating a modified audio component. A user may provide such an indication via a user interface that is presented to the user on the communications device or another computing device connected to the communications device. Alternatively, a user may provide such an indication by a form of a gesture, such as a motion indication or a voice indication.

In some embodiments, a user may provide an indication to generate an audio component for an audio event at any instance. For example, upon purchasing a communications device or upon desiring an audio experience modification, the user may provide an indication to generate an audio component. In other embodiments, a user may provide an indication to generate an audio component for an audio event upon obtaining the audio event. Such a generated audio component may be used to generate a default audio component or to generate a temporary audio component, e.g., the generated audio component pertains only to the specific audio event. For example, upon receiving a phone call, a user may provide an indication of a desire to generate an audio component such that the ongoing music audio fades to the background rather than becoming mute.

The interface outputting component 320 is configured to output a generating user interface that allows a user to interact with the communications device to generate one or more audio components for one or more audio events. The user can interact with the user interface using well known input components—such as, for example, a mouse, joystick, stylus, touch screen, keyboard, or the like. Such a generating user interface may include fields that allow for the selection or input of one or more audio event type, or specifics thereof; one or more audio event attributes; one or more audio space aspects, e.g. position and distance; or a combination thereof.

The input receiving component 330 is configured to receive input indicating one or more audio components for one or more audio events. A user may provide information by selecting or entering data. As such, the user may manipulate the user interface via the communications device screen or keyboard. The input received to indicate one or more audio components may be associated with one or more audio events, an audio event attribute, an audio space, an audio space aspect, or a combination thereof. In one embodiment, the input received by input receiving component 330 may pertain to a default audio component, a temporary audio component, or a combination thereof.

The storing component 340 is configured to store one or more audio components associated with one or more audio events such that an audio experience utilizing the generated audio components may be presented. The storing component 340 may store the audio component associated with an audio event automatically or upon a user indication. In an embodiment where the audio component is stored based on a user indication, the storing component may be configured to receive input indicating a desire to save the generated audio component.

Figure 4A:
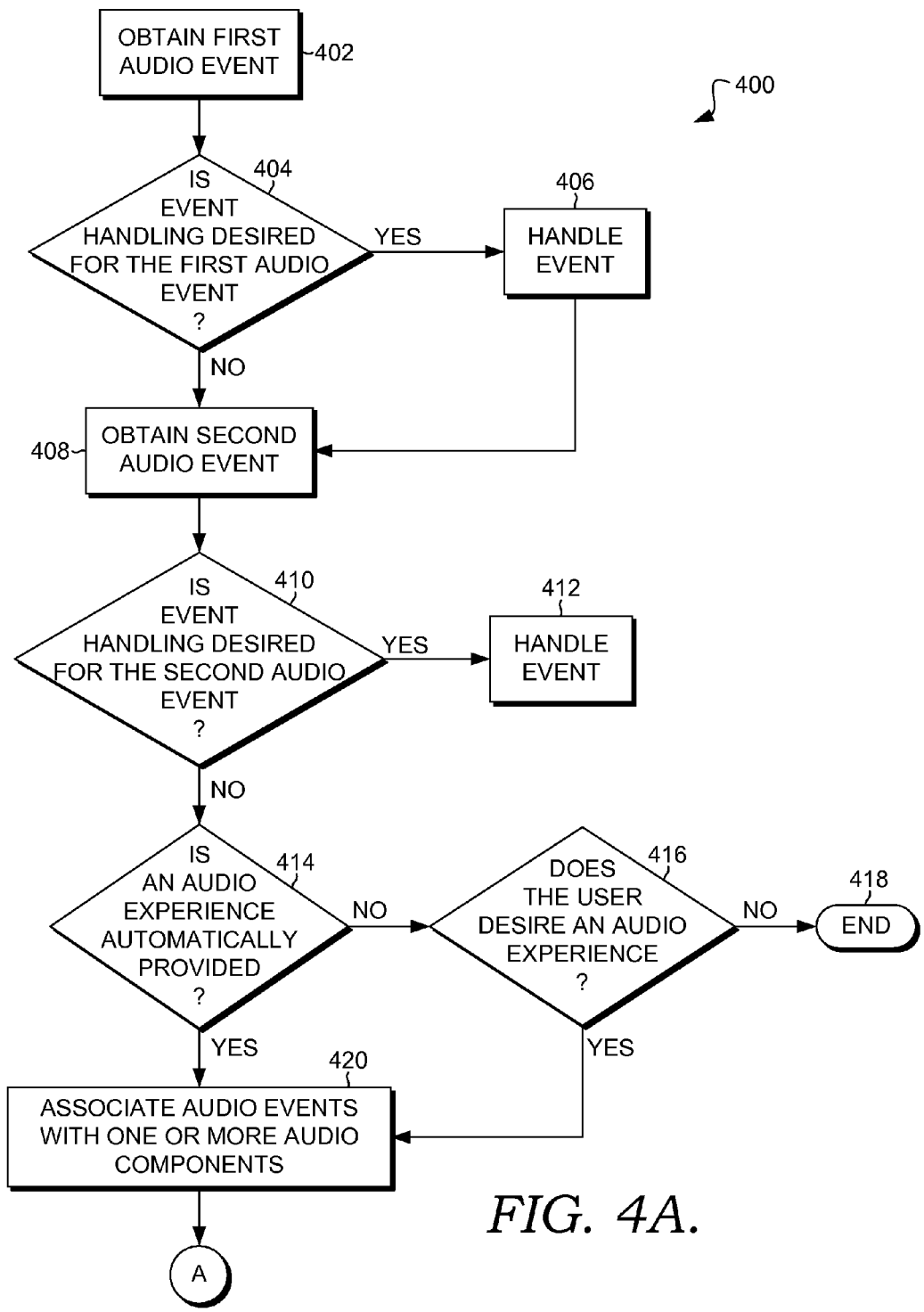
FIG. 4A is a flow diagram representative of a method for providing an audio experience.
Figure 4B:
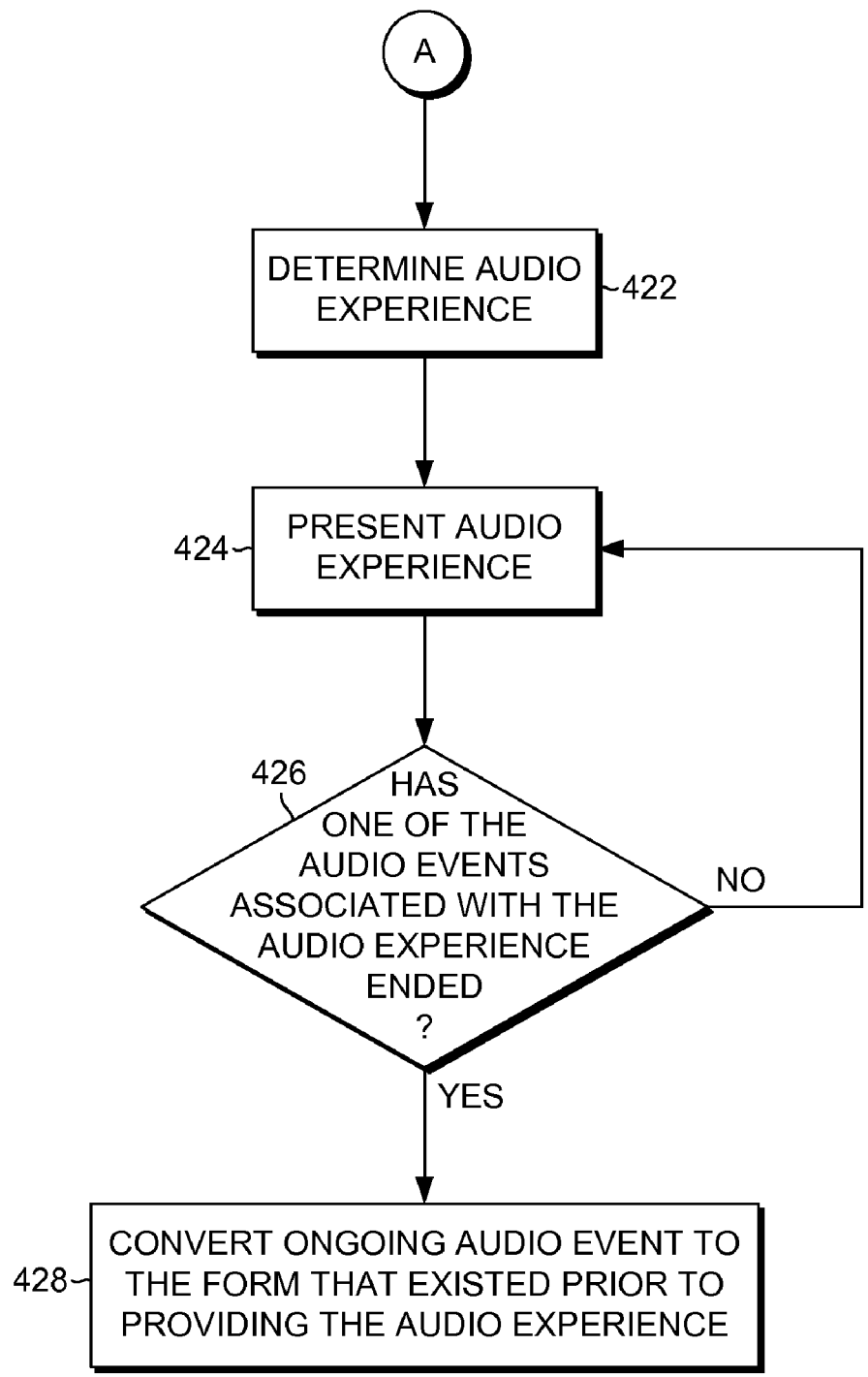
FIG. 4B is a flow diagram representative of a method for providing an audio experience continued from FIG. 4A.

Turning now to FIGS. 4A and 4B, a flow diagram is shown illustrating a method 400 for providing an audio experience, in accordance with an embodiment of the present invention. Initially, as indicated at block 402, a first audio event is obtained. At block 404, it is determined whether event handling is desired for the first audio event. If it is determined that event handling is desired for the first audio event, the event is handled at block 406 and, a second audio event is obtained at block 408. If, however, it is determined that event handling is not desired for the first audio event, the second audio event is obtained at block 408.

Upon obtaining the second audio event at block 408, it is determined, at block 410, whether event handling is desired for the second audio event. If it is determined that event handling is desired for the second audio event, the second audio event is handled at block 412 and, thereafter, it is determined, at block 414, whether an audio experience is automatically provided. If, however, it is determined that event handling is not desired for the second audio event, it is determined, at block 414, whether to automatically provide an audio experience.

If it is determined, at block 414, that an audio experience is not automatically provided, it is then determined, at block 416, if a user desires an audio experience. Such a desire may be determined based on a user indication. If it is determined that the user does not desire an audio experience, the method ends at block 418. On the other hand, if it is determined that the user desire an audio experience, at block 420, the audio events are associated with one or more audio components including, but not limited to, audio event attributes, an audio space, audio space aspects, or a combination thereof. Referring again to block 414, if it is determined that an audio experience is not automatically provided, at block 420, the audio events are associated with one or more audio components including, but not limited to, audio event attributes, an audio space, audio space aspects, or a combination thereof.

Upon associating audio events with one or more audio components at block 420, subsequently, at block 422, the audio experience is determined based on the audio events and the respective associated audio components. The audio experience is presented at block 424. At block 426, it is determined if one of the audio events associated with the audio experience has ended. If it is determined that neither of the audio events associated with the audio experience have ended, the method returns to block 424 and, as such, the audio experience continues to be presented. If, however, it is determined that one of the audio events associated with the audio experience has ended, the ongoing audio event is converted to the form that existed prior to providing the audio experience. This is indicated at block 428. As such, in some embodiments, the audio event returns to the primary channel.

Figure 5:
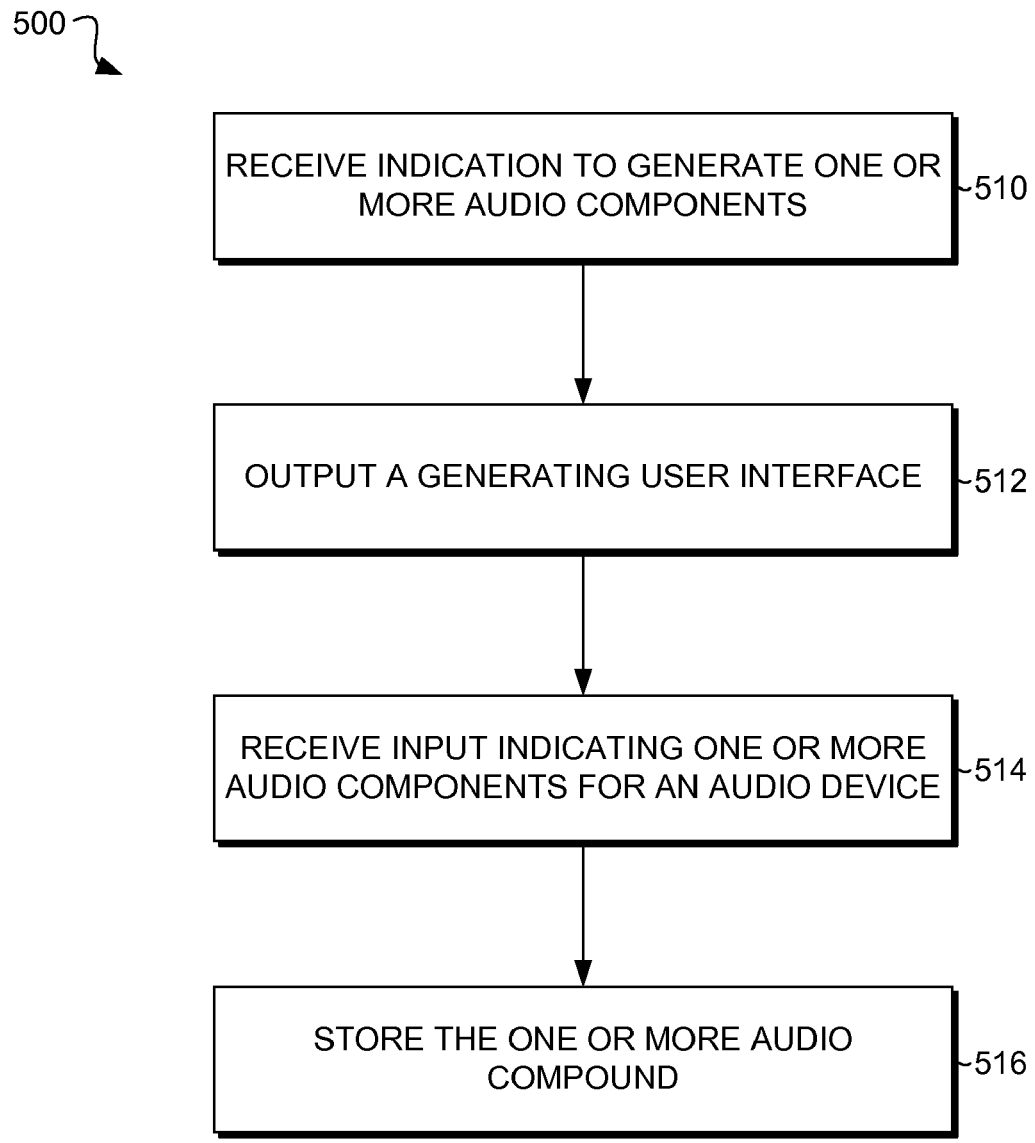
FIG. 5 is a flow diagram representative of a method for generating one or more audio components for an audio event.

With reference to FIG. 5, a flow diagram is shown illustrating a method 500 for generating one or more audio components for one or more audio events. Initially, as indicated at block 510, an indication to generate one or more audio components is received. Subsequently, a generating user interface that allows a user to interact with the communications device is output at block 512. Input indicating one or more audio components for an audio device is received at block 514. Thereafter, the one or more audio components associated with the one or more audio events are stored. This is indicated at block 516.

Figure 6:
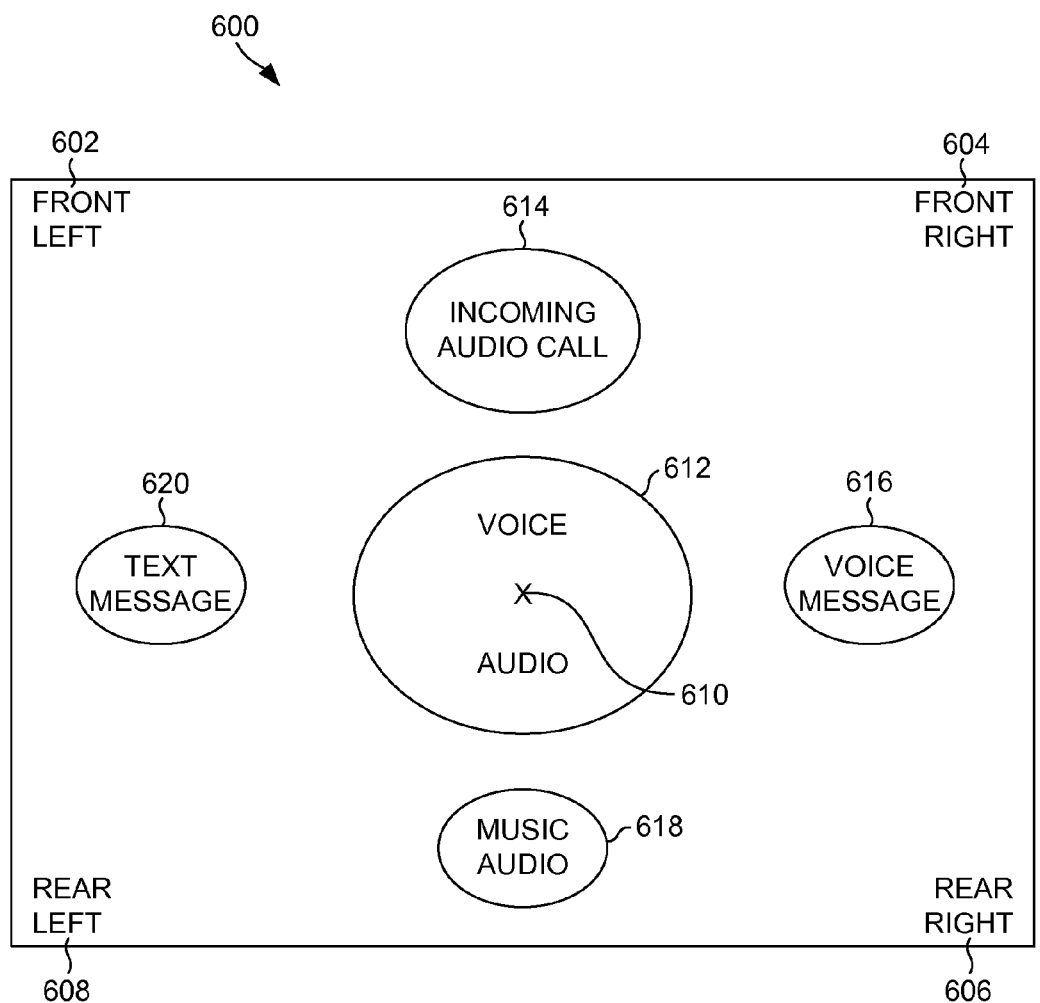
FIG. 6 is a schematic view of a user interface suitable for illustrating one or more audio events having one or more audio components.

Turning now to FIG. 6, an exemplary user interface illustrates one or more audio events having one or more audio components. The user interface described herein may be displayed on any communications device or another computing device connected to a communications device. A communications device user can interact with the displayed user interface using well known input components—such as, for example, a mouse, joystick, stylus, touch screen, keyboard, or the like.

By way of illustration, suppose, for instance, that a user accesses a generating user interface 600 that allows the user to interact with the communications device to generate one or more audio components for one or more audio events. Assume further that, as illustrated in FIG. 6, the generating user interface 600 includes position indicators such as front-left 602, front-right 604, rear-right 606, and rear-left 608. Upon accessing the generating user interface 600, the user may generate audio components for a plurality of audio events, such as voice audio 612, incoming call audio 614, voice message 616, music audio 618, and text message 620. As shown in FIG. 6, in this example, the user selects that a voice audio 612 has audio components including a centrally positioned audio based on the user position 610 and a high volume audio, as indicated by the size of the voice audio 612 area. The user also selects that an incoming call audio 614 has audio components including a front positioned audio based on the central user position 610 and a medium volume audio, as indicated by the size of the incoming call audio 614 area. In addition, the user selects that a voice message 616, a music audio 618, and a text message 620 have audio components including a right positioned audio, a rear positioned audio, and a left positioned audio, respectively, based on the central user position 610 as well as a low volume audio, as indicated by the small size of the voice message 616, music audio 618, and text message 620 areas. As such, for example, a user talking on the phone will adequately hear a centrally balanced voice audio. If, while talking on the phone, an incoming call audio is received by the communications device, according to generating user interface 600 established by the user, the user will hear a diminished ring tone that has an audio space in front of the user.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more nontransitory computer-readable media having computer-executable instructions embodied thereon that, when executed perform a method for providing an audio experience, the method comprising the steps of:

obtaining a first audio event and a second audio event, wherein the first audio event is an audible aspect of a first function of a communication device and the second audio event is an audible aspect of a second function of the communications device;

associating the first audio event with a first corresponding audio component, wherein the first audio component includes a characteristic associated with the first audio event including at least one of an audio space, an audio space aspect, or an audio event attribute;

associating the second audio event with a second corresponding audio component, wherein the second audio component includes a characteristic associated with the second audio event including at least one of an audio space, an audio space aspect, or an audio event attribute;

determining the audio experience based on at least the first audio event and the associated first corresponding audio component and the second audio event and the associated second corresponding audio component, wherein the audio experience includes a spatial perception of the first audio event and a spatial perception of the second audio event; and presenting the audio experience, wherein the audio experience comprises a spatial perception of the first audio event and the second audio event in a spatial audio environment.

2. The one or more nontransitory computer-readable media of claim 1, obtaining the first audio event and second audio event comprises obtaining the audio event and second audio event automatically, based on a user indication, or a combination thereof.

3. The one or more nontransitory computer-readable media of claim 1, wherein the first audio event and the second audio event comprise an incoming call audio, a voice audio, an outgoing call audio, a video audio, a music audio, an alert audio, a text-to-voice audio, or a combination thereof.

4. The one or more nontransitory computer-readable media of claim 1 further comprising handling at least one of the first audio event and the second audio event.

5. The one or more nontransitory computer-readable media of claim 1 further comprising receiving an indication to provide an audio experience.

6. The one or more nontransitory computer-readable media of claim 1, wherein the associated one or more first corresponding audio components and the associated one or more second corresponding audio components comprise an audio space, an audio space aspect, an audio event attribute, or a combination thereof.

7. The one or more nontransitory computer-readable media of claim 1, wherein associating the first audio event with one or more first corresponding audio components and the second audio event with one or more second corresponding audio components is based on an audio event category, an audio event type, a specific audio event, a sequential order of the first audio event and the second audio event, or a combination thereof.

8. The one or more nontransitory computer-readable media of claim 1 further comprising receiving an indication to provide an audio experience.

9. The one or more nontransitory computer-readable media of claim 1, wherein determining the audio experience comprises determining the manipulations necessary to achieve the audio experience.

10. The one or more nontransitory computer-readable media of claim 9, wherein determining the audio experience comprises mixing the sound such that the audio experience may be presented.

11. A system for proving an audio experience, comprising:
an event obtaining component configured to obtain a first audio event and
a second audio event, wherein the first audio event is an audible aspect of a first function of a communication device and the second audio event is an audible aspect of a second function of the communications device;
an associating component configured to associated the first audio event with one or more first corresponding audio components and the second audio event with one or more second corresponding audio components, wherein the one or more first audio components include characteristics associated with the first audio event, and wherein the one or more second audio components include characteristics associated with the second audio event;
an audio experience determining component configured to determine an audio experience based on the first audio event and the associated one or more first corresponding audio components and the second audio event and the associated one or more second corresponding audio components, wherein the audio experience includes a spatial perception of the first audio event and the second audio event; and
a presenting component configured to present the audio experience determined by audio experience determining component wherein the audio experience comprises a spatial perception of the first audio event and the second audio event, wherein the audible aspects of the first function and the second function of the communication device are incorporated into the spatial audio environment, wherein the first audio event occupies a first audio space and the second audio event occupies a second audio space.

12. The system of claim 11 further comprising an event obtaining component configured to obtain the first audio event and the second audio event.

13. The system of claim 11 further comprising a receiving component configured to receive an indication to provide an audio experience.

14. The system of claim 11 further comprising an event handling component configured to handle one or more of the first audio event and the second audio event.

15. One or more nontransitory computer-readable media having computer-executable instructions embodied thereon that, when executed perform a method for generating one or more audio components associated with an audio event, the method comprising the steps of:
receiving an indication to generate the one or more audio components, wherein the one or more audio components include characteristics associated with the audio event, wherein the audio event includes an audible aspect of a function of a communication device, and wherein the one or more audio components define, at least in part, a spatial perception of the audio event in a spatial audio environment;
outputting a generating user interface to allow a user to interact with a communications device to generate the audio component associated with the audio event, wherein the user input selects, at least in part, aspects of the spatial perception of the audio event;
receiving input indicating the one or more audio components associated with the audio event; and
storing the one or more audio components associated with the audio event.

16. The one or more nontransitory computer-readable media of claim 15, wherein the one or more audio components comprise one or more audio event attributes, one or more audio space aspects, one or more audio spaces, or a combination thereof.

17. The one or more nontransitory computer-readable media of claim 15 further comprising receiving input indicating a desire to save the one or more audio components.

18. The one or more nontransitory computer-readable media of claim 15, wherein the input indicating the one or more audio components associated with the audio events comprises a default audio component, a temporary audio component, or a combination thereof.

19. The one or more nontransitory computer-readable media of claim 15, wherein receiving an indication to generate one or more audio components comprises receiving an indication upon obtaining the audio event, at any instance, or a combination thereof.

20. The one or more nontransitory computer-readable media of claim 15, wherein the input received indicating the one or more audio components associated with the audio event comprises an audio event, one or more audio event attributes, an audio space, one or more audio space aspects, or a combination thereof.

* * * * *